(12) United States Patent
Ganti Mahapatruni et al.

(10) Patent No.: US 11,429,992 B2
(45) Date of Patent: Aug. 30, 2022

(54) SYSTEMS AND METHODS FOR DYNAMIC PRICING

(71) Applicant: Walmart Apollo, LLC, Bentonville, AR (US)

(72) Inventors: Ravi Sastry Ganti Mahapatruni, San Mateo, CA (US); Matyas Attila Sustik, San Francisco, CA (US); Quoc Tan Tran, Los Altos, CA (US); Brian Thomas Seaman, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 116 days.

(21) Appl. No.: 16/202,065

(22) Filed: Nov. 27, 2018

(65) Prior Publication Data
US 2019/0172082 A1  Jun. 6, 2019

Related U.S. Application Data

(60) Provisional application No. 62/591,076, filed on Nov. 27, 2017.

(51) Int. Cl.
*G06Q 30/02* (2012.01)
*G06N 20/00* (2019.01)
*G06N 5/04* (2006.01)
*G06Q 10/06* (2012.01)

(52) U.S. Cl.
CPC ......... *G06Q 30/0206* (2013.01); *G06N 5/048* (2013.01); *G06N 20/00* (2019.01); *G06Q 10/067* (2013.01); *G06Q 30/0202* (2013.01)

(58) Field of Classification Search
USPC ....................................................... 705/7.31
See application file for complete search history.

(56) References Cited

U.S. PATENT DOCUMENTS

| 2008/0201271 | A1  | 8/2008 | Davis et al. |
|---|---|---|---|
| 2010/0095232 | A1  | 4/2010 | Ramsay |
| 2011/0004506 | A1* | 1/2011 | May ...................... G06Q 30/02 705/7.29 |

(Continued)

OTHER PUBLICATIONS

Thimmapuram et al. (P. R. Thimmapuram, Jinho Kim, A. Botterud and Youngwoo Nam, "Modeling and simulation of price elasticity of demand using an agent-based model," 2010 Innovative Smart Grid Technologies (ISGT), 2010, pp. 1-8, doi: 10.1109/ISGT.2010. 5434739.).*

(Continued)

*Primary Examiner* — Matthew D Henry
(74) *Attorney, Agent, or Firm* — Bryan Cave Leighton Paisner LLP

(57) ABSTRACT

Systems and methods can include one or more processing modules and one or more non-transitory storage modules storing computing instructions configured to run on the one or more processing modules and perform acts of: estimating demand for one or more items in an electronic basket of items using one or more different demand models; estimating elasticity for the one or more items in the electronic basket of items using a multi-armed bandit model; determining a price using the demand and the elasticity; and facilitating display of the price on a video screen of a device. Other embodiments are disclosed herein.

20 Claims, 10 Drawing Sheets

(56) References Cited

U.S. PATENT DOCUMENTS

| | | | |
|---|---|---|---|
| 2012/0316919 A1 | 12/2012 | Vardar et al. | |
| 2013/0325554 A1* | 12/2013 | Ouimet | G06Q 30/02 |
| | | | 705/7.35 |
| 2014/0089144 A1 | 3/2014 | Li et al. | |
| 2014/0200992 A1 | 7/2014 | Wang et al. | |
| 2017/0098236 A1* | 4/2017 | Lee | G06Q 10/067 |
| 2017/0200087 A1* | 7/2017 | Mascaro | G06Q 40/12 |
| 2017/0278114 A1* | 9/2017 | Renders | G06Q 30/0282 |
| 2018/0137455 A1 | 5/2018 | Mack et al. | |
| 2018/0211303 A1* | 7/2018 | Chatwin | G06N 20/00 |

OTHER PUBLICATIONS

McCullagh, P. and Nelder, FRS, J.A., Generalized Linear Models, 2nd Edition, Chapman and Hall, 1989 Apr. 1989.
Bruin, J., Newtest: Command to Compute New Test, UCLA: Statistical Consulting Group, retrieved from https://status.dre.ucla.edu/stata/ado/analysis/, 2006.

\* cited by examiner

SYSTEMS AND METHODS FOR DYNAMIC PRICING

CROSS REFERENCE TO RELATED APPLICATIONS

This application claims the benefit of U.S. Provisional Application No. 62/591,076, filed on Nov. 27, 2018, which is herein incorporated by reference in its entirety.

TECHNICAL FIELD

This disclosure relates generally to information systems, and more specifically to systems that dynamically calculate prices.

BACKGROUND

In the past, work on dynamic pricing has focused on cases of known demands with other constraints applied (e.g., inventory constraints). Dynamic pricing under unknown demand constraints has gained attention since the mid-2000s. In some past examples, a demand function can be assumed to come from a parametric family of models with unknown parameter values. A Bayesian approach can be applied, a prior distribution can be used on unknown parameters, and posteriors can be obtained via a Bayes theorem. Past dynamic pricing problems can be modeled as an infinite horizon discounted revenue maximization problem. A certainty-equivalence heuristic can be introduced, which can be an approximate dynamic programming solution to obtain a dynamic pricing solution. Other past examples have introduced different approximate dynamic programming heuristics to provide a solution to a dynamic pricing problem. While Bayesian approaches, such as the ones mentioned above, are attractive as they permit modeling parameter uncertainties explicitly, but they often lead to intractabilities, such as an inability to compute a posterior in closed form. Non-Bayesian approaches may offer computational benefits over Bayesian methods. In a non-Bayesian context, non-myopic policies for dynamic pricing under unknown demand function have been investigated. These examples proposed a variant of one-step lookahead policies which, instead of maximizing the revenue at a next step, maximize revenue for two steps. These previous approaches applied a semi-myopic policy to a binomial demand distribution with logit expectation and compared performance of these policies with other myopic policies. They showed, via simulations, that one-step lookahead policies could significantly outperform myopic policies. Various other semi-myopic policies also have been investigated.

Semi-myopic policies, such as one-step lookahead policies in the non-Bayesian context and approximate Bayesian dynamic programming-based solutions, provide tractable dynamic pricing policies. However, these approaches lack theoretical guarantees. Recent work in dynamic pricing has been geared toward obtaining suboptimal, yet tractable, dynamic pricing policies with provable guarantees. Some past systems take a non-Bayesian approach to dynamic pricing. These past systems use exploration-exploitation style algorithms where, in the first phase (exploration), multiple prices are tried out and demand functions are estimated at these multiple price points, and in the second phase, the optimal price is chosen by solving a revenue maximization problem. Further past systems considered a problem of dynamic pricing under an assumption that a true model is one of two given parametric models. These past systems showed that myopic policies that try to maximize immediate revenue can fail, and that myopic Bayesian (and also non-Bayesian) policies can lead to convergence to an incorrect model, and hence what is termed as incomplete learning. Still further examples looked at various parametric models for a demand function and derive exploration-exploitation-based policies using maximum likelihood-based formulations. This exploration-exploitation style of dynamic pricing can maximize cumulative revenue over only a finite horizon.

BRIEF DESCRIPTION OF THE DRAWINGS

To facilitate further description of the embodiments, the following drawings are provided in which.

Figure 1:
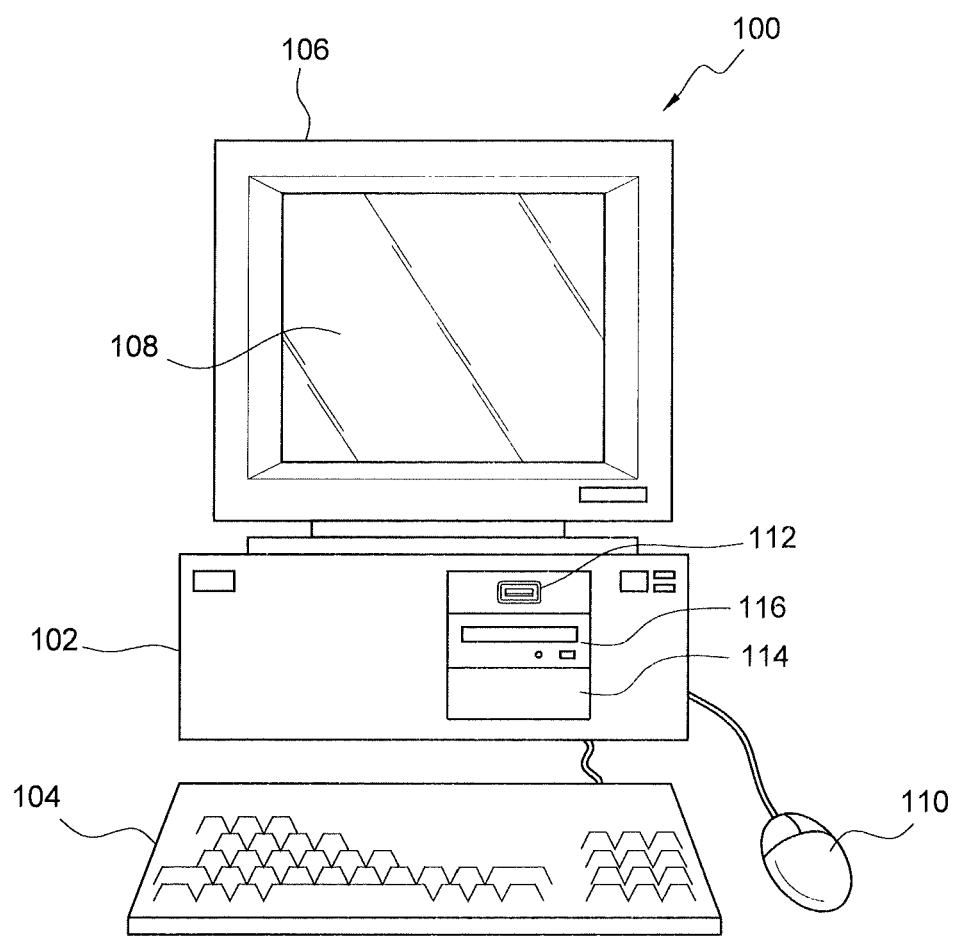
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform acts of estimating demand for one or more items in an electronic basket of items using one or more different demand models; estimating elasticity for the one or more items in the electronic basket of items using a multi-armed bandit model; determining a price using the demand and the elasticity; and facilitating a display of the price on a video screen of a device.

Various embodiments include a method. The method can include estimating demand for one or more items in an electronic basket of items using one or more different demand models; estimating elasticity for the one or more items in the electronic basket of items using a multi-armed bandit model; determining a price using the demand and the elasticity; and facilitating display of the price on a video screen of a device.

Figure 2:
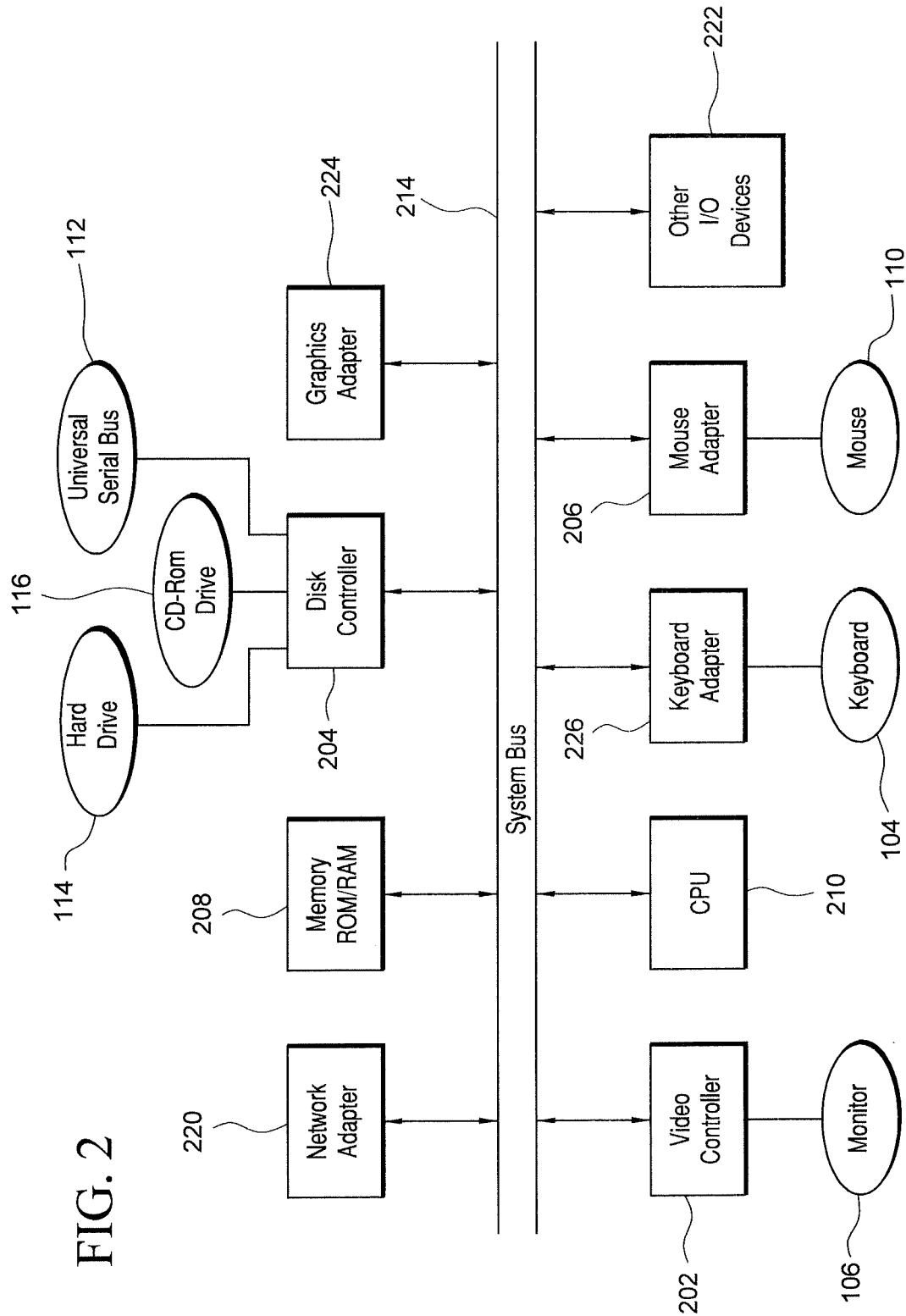
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
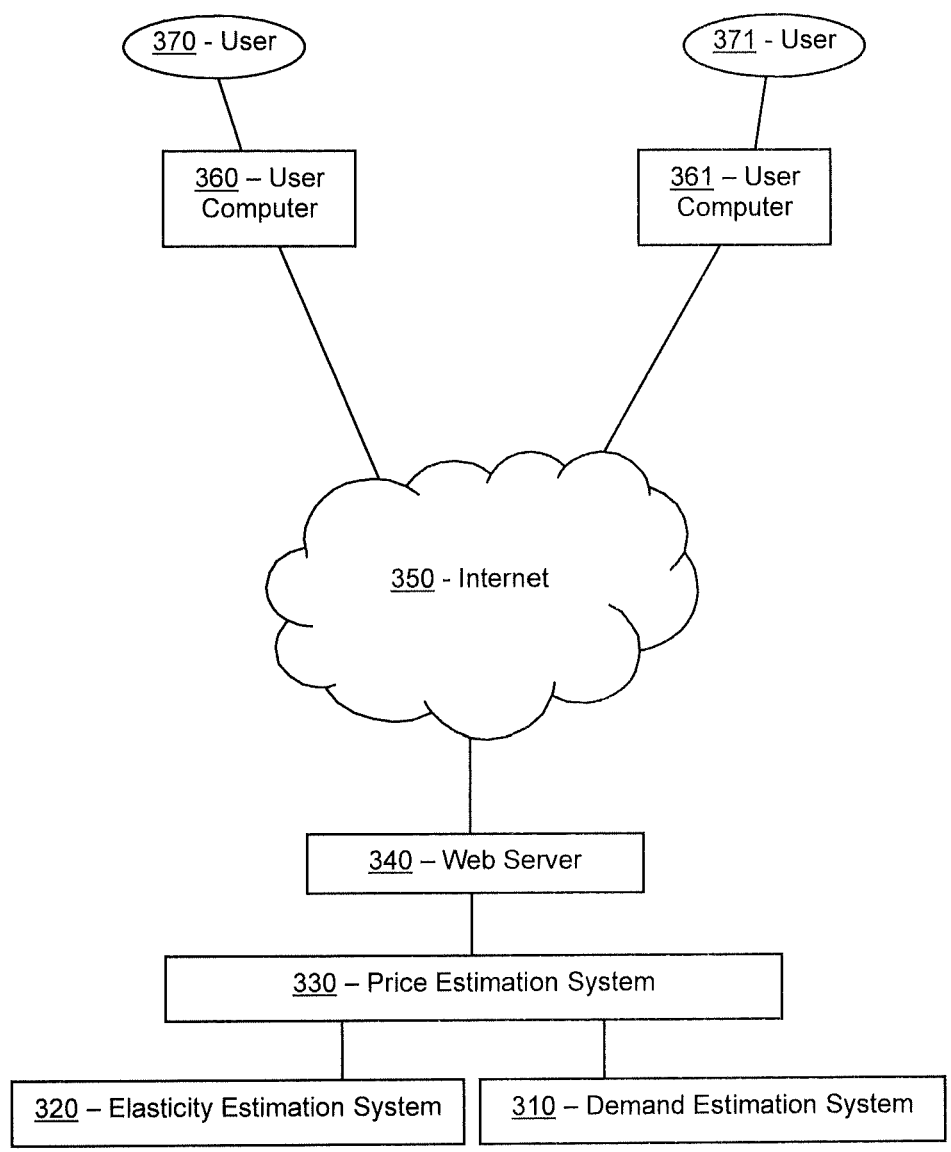
FIG. 3 illustrates a representative block diagram of a system, according to an embodiment.

Turning ahead in the drawings, FIG. 3 illustrates a block diagram of a system 300 that can be employed for dynamically estimating prices, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a demand estimation system 310, an elasticity estimation system 320, a price estimation system 330, and/or a web server 340. Demand estimation system 310, elasticity estimation system 320, price estimation system 330, and/or web server 340 can each be a computer system, such as computer system 100 (FIG. 1), as described above, and can each be a single computer, a single server, or a cluster or collection of computers or servers, or a cloud of computers or servers. In another embodiment, a single computer system can host each of two or more of demand estimation system 310, elasticity estimation system 320, price estimation system 330, and/or web server 340. Additional details regarding demand estimation system 310, elasticity estimation system 320, price estimation system 330, and/or web server 340 are described herein.

In many embodiments, system 300 also can comprise user computers 360, 361. User computers 360, 361 can comprise any of the elements described in relation to computer system 100. In some embodiments, user computers 360, 361 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 340 can be in data communication through Internet 350 with user computers (e.g., 360, 361). In certain embodiments, user computers 360, 361 can be desktop computers, laptop computers, smart phones, tablet devices, and/or other endpoint devices. Web server 340 can host one or more websites. For example, web server 340 can host an e-commerce website that allows users to browse and/or search for products, to add products to an electronic shopping cart, and/or to purchase products, in addition to other suitable activities.

In many embodiments, demand estimation system 310, elasticity estimation system 320, price estimation system 330, and/or web server 340 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) demand estimation system 310, elasticity estimation system 320, price estimation system 330, and/or web server 340 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of demand estimation system 310, elasticity estimation system 320, price estimation system 330, and/or web server 340. In a similar manner, the processing module(s) and the memory storage module(s) can be local and/or remote to each other.

In many embodiments, demand estimation system 310, elasticity estimation system 320, price estimation system 330, and/or web server 340 can be configured to communicate with one or more user computers 360, 361. In some embodiments, user computers 360, 361 also can be referred to as customer computers. In some embodiments, demand estimation system 310, elasticity estimation system 320, price estimation system 330, and/or web server 340 can communicate or interface (e.g., interact) with one or more customer computers (such as user computers 360, 361) through a network or Internet 350. Internet 350 can be an intranet that is not open to the public. Accordingly, in many embodiments, demand estimation system 310, elasticity estimation system 320, price estimation system 330, and/or web server 340 (and/or the software used by such systems) can refer to a back end of system 300 operated by an operator and/or administrator of system 300, and user computers 360, 361 (and/or the software used by such systems) can refer to a front end of system 300 used by one or more users 370, 371, respectively. In some embodiments, users 370, 371 also can be referred to as customers, in which case, user computers 360, 361 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, demand estimation system 310, elasticity estimation system 320, price estimation system 330, and/or web server 340 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between demand estimation system 310, elasticity estimation system 320, price estimation system 330, and/or web server 340, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
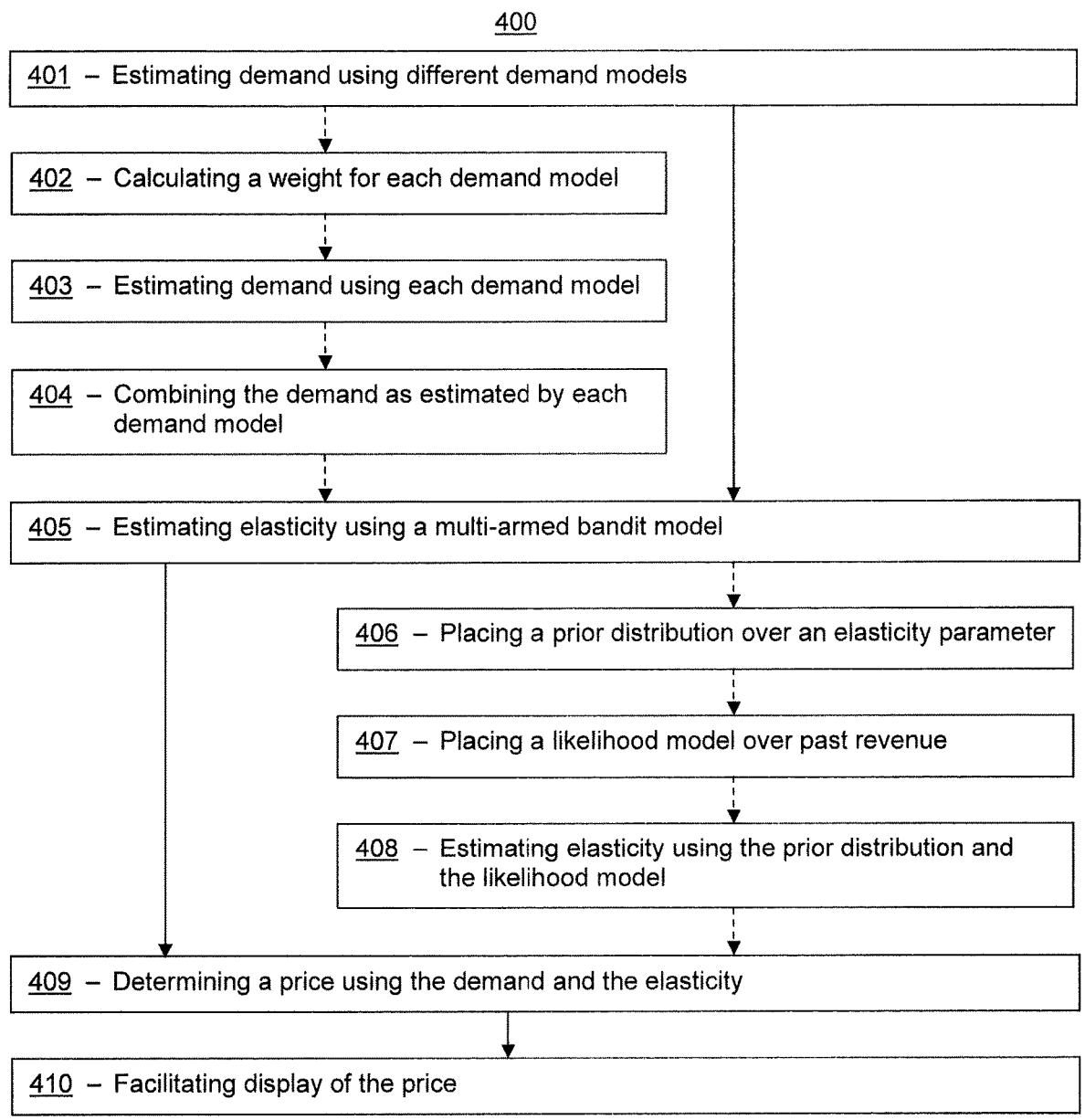
FIG. 4 is a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as demand estimation system 310, elasticity estimation system 320, price estimation system 330, and/or web server 340 (FIG. 3). The processing module(s) can be similar or identical to the processing module(s) described above with respect to computer system 100 (FIG. 1).

The Internet has permitted many industries to go online. E-commerce, which entails selling of both physical goods and digital goods via the Internet, is one of the most vibrant industries in modern times. Large all-purpose e-commerce retailers (e.g., Walmart.com, Amazon.com, Jet.com, Target.com), and more specialized and/or niche e-commerce retailers (e.g., Moosejaw.com, Modcloth.com, Shoe-buy.com, Wine.com, Bonobos.com) have shifted commerce from an offline medium to an online medium. While the biggest brick-and-mortar stores are constrained by shelf space and tend to stock only approximately 100,000 items each, large e-commerce retailers are less constrained by shelf space and may carry more than 400 million items each. E-commerce retailers also have benefited from a digital economy and an explosion of online activity in general. It can be difficult to study customer behavior online, such as, for example, what items a customer viewed on a website, what items are popular in general, what items a customer bought in the past due to problems with the computer environment. For example, it can be very difficult to track a user when a user changes devices, browses a website while logged out of their account on that website, or uses an internet browser in private mode (e.g., Google Chrome's Incognito mode). This difficulty inherent in the ambiguity of some online interactions can prevent e-commerce retailers from using this personalized information to generate actionable insights to entice and retain customers.

One problem retailers need to solve due to this ambiguity is how to price items correctly because without personalized information it may be difficult to determine whether a customer abandoned a cart or did not purchase an item due to price or for other reasons. Setting the prices too high or too low can therefore cause a bad customer experience (which is hard to detect without personalized transaction data) and dramatically affect the bottom-line of the retailer. For brick-and-mortar retailers, due to the aforementioned smaller catalog and the inherent cost and difficulty in changing prices (e.g., printing new price placards and replacing all price placards in a store), pricing of items can be an easy problem solved intermittently throughout the year. However, a very large catalogue, an ability to collect large amounts of user behavior data, and a relative ease with which price changes can be made on a large scale make the problem of pricing items challenging in an e-commerce setting. Static pricing, as seen in many brick-and-mortar stores, does not simulate the demand/price curve, nor does it allow a store to respond to competitor price changes. Moreover brick-and-mortar static pricing is unable to fully exploit the power of computation, big data, and the ease of implementing price changes in an online world. As a result, dynamic pricing may be preferred in an e-commerce setting.

Dynamic pricing in an e-commerce setting can be a hard problem to solve due to a scale of the problem (e.g., the aforementioned large e-commerce catalogue) and uncertain user behavior (e.g., the aforementioned anonymity of some user interactions with the internet). It may be unclear how to use past collected data to come up with better prices. Past approaches to dynamic pricing can include performing at least four steps: (i) collecting historical data about the price of an item and the demand of the item at different price points, (ii) positing a statistical model for demand as a function of price and estimating model parameters using historical data, (iii) using a learned demand function which optimizes some metric of interest (most commonly revenue) to get a new optimal price, and (iv) applying an obtained optimal price to an item for a short amount of time before repeating the process. These approaches to dynamic pricing can be classified as passive learning approaches. Such approaches suffer because they can be myopic, and try to optimize for a metric in the short term without trying to make an active effort to learn a demand function. In fact, such approaches have been shown to lead to incomplete learning, have poor performance, and lose revenue on the long run. These problems and others not disclosed can be solved by implementing dynamic pricing systems and/or methods as described herein.

In some embodiments, an approach to demand modeling in pricing problems may be to assume that a demand function comes from a parametric family, and then to estimate parameters of an underlying function using various statistical techniques. In some embodiments, a parametric model can comprise a linear model, a log-linear model, a constant elasticity model, and/or a logit model. Parametric modeling may be advantageous in a dynamic pricing system because it allows one to build simple, explainable models, and also allows for simple pricing algorithms that run smoothly on lower end computer systems. However, commonly used models, both parametric and non-parametric, in demand modeling tend to assume that an underlying demand function is stationary. In reality a demand function is not stationary, and it may be desirable to dynamically model a demand function in real world pricing systems. In order to do so, a dynamic pricing system can adapt commonly used demand functions to account for possible changes in an underlying demand function.

Therefore, in many embodiments, method 400 can comprise an activity 401 of estimating demand using one or more different demand models. In the same of different embodiments, a demand model can comprise a parametric model. In various embodiments, a parametric model can comprise a linear model, a log-linear model, a constant elasticity model, and/or a logit model. In many embodiments, one or more different demand model can comprise a time-series model such as an autoregressive moving average (ARMA) model, an autoregressive integrated moving average (ARIMA) model, an exponentially weighted moving average model (EWMA), and/or an autoregressive model (AR(k)). In the same or different embodiments, a one or more different demand models can comprise a non-time series model such as a logistic regression model.

In many embodiments, demand may be estimated for one or more items in an electronic basket of items. In the same or different embodiments, one or more items can comprise one or more products in an online catalogue of an e-commerce retailer. In various embodiments, an electronic basket of items can comprise a group of items sold by an e-commerce retailer. In many embodiments, an electronic basket of items can comprise similar items and/or items placed in an online shopping cart by a user.

In many embodiments, demand can be estimated using a constant elasticity model. In the same or different embodiments, a constant elasticity model can comprise an equation comprising $$d_i(p_i) = f_i \left( \frac{p_i}{p_{0,i}} \right)^{\gamma_{*,i}},$$

where $d_i(p_i)$ comprises a demand of one or more items i at price $p_{0,i}$, $f_i$ comprises a baseline demand at price $p_{0,i}$ for the one or more items i, and $\gamma_{\star,i}$, which can be $<-1$, comprises a price elasticity of item i. In the same or different embodiments, in order to account for possible changes in an underlying demand function, demand can be estimated using an equation comprising $$d_{i,t}(p_i) = f_{i,t}\left(\frac{p_i}{p_{i,t-1}}\right)^{\gamma_{\star,i}},$$

where $f_{i,t}$ comprises a demand forecast for one or more items i on a day t if a price is $p_{i,t-1}$, and, $\gamma_{\star,i}$ comprises a price elasticity of item i. In various embodiments, demand can be estimated every day, week, month, and/or year. In many embodiments, demand can be estimated continuously or intermittently on time periods as determined by an administrator of a dynamic pricing system. In some embodiments, the demand forecasts can be made available for each item on each day. In the same or different embodiments, a demand estimation system can take an observed demand for one or more items i previously calculated at different price points (e.g., $(p_{i,1}, d_{i,1})$, ... $(p_{i,t-1}, d_{i,t-1})$) at time t, for one or more items i, and can then estimate $f_{i,t}$.

In many embodiments, method 400 can comprise an activity 402 of calculating a weight for each demand model. In some embodiments, a weight for a demand model depends on a past performance and/or an accuracy of each demand model. In the same or different embodiments, demand models that perform better are given a larger weight, and therefore have a larger influence in an overall demand estimation.

In many embodiments, method 400 can comprise an activity 403 of estimating the demand for one or more items in the electronic basket of items using each demand model of the multiple demand models. In various embodiments, one or more different demand models can be applied to an electronic basket as a whole, individual items in the electronic basket, and/or groups of items within the electronic basket. In the same or different embodiments, one or more different demand models can be applied sequentially to an electronic basket of items, individual items within the electronic basket of items, and/or groups of items within the electronic basket of items. In many embodiments, one or more different demand models can be applied simultaneously to an electronic basket of items, individual items within the electronic basket of items, and/or groups of items within the electronic basket of items.

In many embodiments, method 400 can comprise an activity 404 of combining the demand, as estimated by each demand model of multiple demand models, into a combined estimated demand using a weight for each demand model of the multiple demand models. In various embodiments, weights of one or more different demand models can be used to generate a new model that estimates overall demand for one or more items. In some embodiments of method 400, activities 402, 403, and 404 are part of activity 401. In the same or different embodiments, one or more of activities 402, 403, and 404 can be optional.

In many embodiments, a price elasticity system can estimate an elasticity parameter $\gamma_{\star,i}$ for each item i of one or more items. $\gamma_{\star,i}$ therefore can capture how a demand of one or more items i can change with a price. In the same or different embodiments, when $p_{i,t}$ is close to $p_{i,t-1}$, then the aforementioned demand estimation equation in exponential form can be approximated using a linear equation comprising:

$$d_{i,t}(p_i) \approx f_{i,t} + (p_i - p_{i,t-1})\frac{f_{i,t}\gamma_{\star,i}}{p_{i,t-1}},$$

where $f_{i,t}$ comprises a demand forecast for one or more items i on a day t when a price is $p_{i,t-1}$, and, $\gamma_{\star,i}$ comprises a price elasticity of item i. In many embodiments, this linear approximation can be used to estimate elasticity. In various embodiments, elasticity estimation can be reduced to a linear regression problem which can be solved using an ordinary least squares (OLS) approach or a robust linear squares (RLS) approach. In the same or different embodiments, instead of looking at all of the past data for an item, one can focus on recent data (e.g., 1 day, 2 days, 7 days, 1 month, 2 months, or 7 months) to estimate elasticities. Estimating elasticities can be more difficult than demand forecasting because, if an item has k distinct and recent price points, then elasticity for this item can be estimated using only k data points. In many embodiments, it is common to see k being less than 5. Hence, elasticity estimation is plagued by a data sparsity problem. In these embodiments, a price elasticity system can mitigate a data sparsity problem to some by using clustering techniques, such as k means, to group items with similar elasticities and estimate an elasticity of these items together.

Price elasticity of an item reflects how a demand changes when a price of one or more items changes. When a price of one or more items does not change often, as is typical in e-commerce, it can become very difficult to estimate an elasticity. This situation can in turn lead to fewer price changes, and, when prices are changed, sub-optimal price changes. Moreover, due to poor estimation of elasticities, there can be a high uncertainty in elasticity estimates. One solution to this problem is to model elasticities as a robust optimization problem. In a robust optimization problem, an elasticity parameter can be seen as an uncertain quantity, and revenue can be maximized with respect to a worse possible value of elasticity. In some embodiments, a robust optimization problem can comprise an equation comprising $$p_t = \arg\max_p \min_{\gamma_\star \in \mathcal{G}} \sum_{i \in \mathcal{B}} \frac{p_i^2 f_{i,t}\gamma_{\star,i}}{p_{i,t-1}} - p_i f_{i,t}\gamma_{\star,i} + p_i f_{i,t}$$

subject to $p=[p_1, p_2, \ldots, p_{|\mathcal{B}|}] \in \mathcal{C}_t$, where a set $\mathcal{G} \subset \mathcal{R}^{|\mathcal{B}|}$ comprises a set of possible values for $\gamma_\star$, $p_i$ comprises a price of one or more items i, $f_{i,t}$ comprises a demand forecast for one or more items i on a day t, $\gamma_{\star,i}$ comprises a price elasticity of item i, $\mathcal{B}$ comprises a basket of items, $\mathcal{G}$ comprises a possible value for $\gamma_\star$, and $\mathcal{C}_t$ comprises at least one possible price assigned to an item in the basket of items. In some embodiments, a robust optimization formulation replaces a point estimate for a vector $\gamma_\star$ with one of infinite possible values, constrained to be in a set $\mathcal{G}$. This approach can be very pessimistic, and can allow no clear way to incorporate feedback to update the set $\mathcal{G}$ as more data is gathered.

Decision making under uncertainty on the internet and in machine learning can be a broad area, which, as the name suggests, focuses on how computers make decisions to maximize some objective when there is uncertainty in estimates related to an objective function. This broad class of algorithms has found various applications in online search, online advertising, online recommendations, route planning for location enabled systems, and many other computer applications. For example, in search, it can be unclear what click-through-rates (CTRs) of certain webpages are because these webpages have never been shown to users or have been shown to very few users.

Solutions to problems involving computer decision making under uncertainty can involve exploration, which can involve making potentially sub-optimal decisions, in order to gain additional data to improve estimates and lower uncertainty. While making sub-optimal decisions (e.g., exploration) can help gather more information on online interactions, it also can harm the user experience, and therefore algorithms using this general framework must take care to explore the correct amount. Passive learning algorithms, such those described above, are focused purely on exploitation, do not explore, and therefore lose out on revenue over long periods of time.

In many embodiments, method 400 can comprise an activity 405 of estimating elasticity using a multi-armed bandit (MAB) model, otherwise referred to as a MAB algorithm. Various algorithms have been devised to handle an exploration-exploitation trade-off. In the same or different embodiments, a MAB model can be described as follows: there are k arms, and choosing an arm gives an independent and identically distributed reward from a fixed unknown probability distribution that depends on the arm. In various embodiments, choosing an arm i gives no information about any other arm j, and therefore j≠i. In some embodiments, an administrator of the algorithm is tasked with obtaining a maximum possible reward in T rounds, where, in each round, the administrator chooses one arm of the k arms, and obtains an independent and identically distributed reward associated with an arm distribution.

In many embodiments, a MAB algorithm can be to pull each arm once (or maybe a few times), calculate an average reward of each arm, and then, for the rest of the time, choose an arm that gave a maximum reward. This algorithm can be sub-optimal, as it is too greedy and suffers similar drawbacks to the passive learning algorithms described above. In the same or different embodiments, another MAB algorithm can be to choose an arm with a best reward each time with probability 1−∈, and, with a probability ∈, choose a random arm. In some embodiments, when ∈=0, this MAB algorithm reduces to a greedy algorithm. In the same or different embodiments, when ∈=1, this MAB algorithm becomes a purely explorative algorithm. However, with a correct choice of ∈, a MAB algorithm can improve its outcomes over other MAB algorithms. In the same or different embodiments, such algorithms can be known as ∈-greedy algorithms. In various embodiments, performance of ∈-greedy algorithms can be measured in terms of regret, which can describe how well an ∈-greedy algorithm performs in comparison to an oracle algorithm that knows a best arm a priori. In some embodiments, when an average regret of an algorithm converges to 0, then the algorithm can be said to be consistent. While an ∈-greedy algorithm can be consistent for a correct value of ∈, more productive algorithms exist, which are described herein.

In many embodiments, a generalization of a multi-armed bandit problem can be known as a bandit optimization problem, which solves an optimization problem while certain parameters are unknown. For example, in a bandit linear optimization problem, an optimization problem can comprise $\max_{x \in \mathcal{C}} x^T \theta_\star$, where x comprises an optimization variable, $\mathcal{C}$ comprises a known polytope, and $\theta_\star$ comprises an unknown vector. In the same or different embodiments, a bandit game can then proceed in rounds such that, in each round, a user proposes a x and then gets to see a noisy evaluation of an objective function $x^T \theta_\star$.

In many embodiments, a MAB model can comprise an upper confidence bound (UCB) algorithm, otherwise known as an UCB model. In various embodiments, an UCB model can construct confidence bounds on a reward of each arm, and then choose an arm that has a largest upper confidence bound. An UCB algorithm and its variants can be optimal, consistent algorithms that perform well. In some embodiments, implementing a UCB model comprises accurately estimating confidence bounds, which can prove to be difficult in complex decision making problems.

In many embodiments, a MAB algorithm can comprise a Thompson sampling (TS) algorithm, otherwise referred to as a TS model. In some embodiments, a TS model can comprise a Bayesian algorithm that places a prior distribution on the reward of the arms, and this distribution can be updated using a Bayes rule as the TS algorithm gathers feedback from previous actions. In the same or different embodiments, a TS algorithm can be based on probability matching (e.g., an arm is chosen with probability equal to a probability of the arm being an optimal arm). A TS model can be a consistent algorithm, and also can be easier to implement than the UCB algorithm because a TS algorithm can avoid explicitly constructing confidence intervals around uncertain parameters. These properties of a TS algorithm make it an attractive choice for real-world applications of MAB algorithms.

In some embodiments, a MAB algorithm can model uncertainty in elasticity values in order to estimate elasticity, and therefore assume that there is no uncertainty in a demand estimation. In other words, a dynamic pricing system can assume that a demand forecasting system is perfect and generates an accurate estimate of demand. This assumption is reasonable because demand forecasts are relatively easier to estimate when compared to price elasticities because they generally do not suffer from a data sparsity problem. For this reason, a MAB algorithm as applied by a dynamic pricing system can focus on modeling uncertainties in price elasticities.

In many embodiments, method 400 can comprise an activity 406 of placing a prior distribution over an elasticity parameter for the one or more items in the electronic basket of items. In the same or different embodiments, a MAB model can comprise putting a prior distribution over unknown parameters. In some embodiments, because $\gamma_\star$ (e.g., an elasticity or an elasticity parameter) is unknown, a dynamic pricing system can put a prior distribution over $\gamma_\star$.

In many embodiments, method 400 can comprise an activity 407 of placing a likelihood model over past revenue for the one or more items in the electronic basket of items. In the same or different embodiments, a dynamic pricing system can put a likelihood model on observed revenue each day because revenue corresponding to pricing decisions each day can be observed. Letting, $R_t$ be the observed revenue of a basket and defining the revenue of the basket as the sum of revenues of all items, a probabilistic model can comprise equations comprising:

$$\Pi_0(\gamma_\star) = N(\mu_0, \Sigma_0);$$

-continued $$l(R_t; Rev_t, \gamma_\star) = N(R_t; Rev_t, \sigma^2);$$

$$Rev_t(p; \gamma_\star, f_t) = \sum_{i \in B} \frac{p_i^2 f_{i,t} \gamma_{\star,i}}{p_{i,t-1}} - p_i f_{i,t} \gamma_{\star,i} + p_i f_{i,t}; \text{ and}$$

$\Pi_t(\gamma_\star) \propto \Pi_{t-1}(\gamma_\star) N(R_t; Rev_t, \sigma^2)$, where $p_i$ comprises a price of one or more items i, $f_{i,t}$ comprises a demand forecast for one or more items i on a day t, $\gamma_{\star,i}$ comprises a price elasticity of item i, $\Pi_0(\gamma_\star)$ comprises a prior distribution on $\gamma_\star$, $\mu_0$ comprises a mean of a prior distribution on $\gamma_\star$, $N(\mu_0, \Sigma_0)$ comprises a normal distribution of the mean of the prior distribution and a covariance matrix, $\Sigma_0$ comprises the covariance matrix, and $(R_t; Rev_t, \gamma_\star)$ comprises a likelihood of observing $R_t$ when an average revenue comprises $Rev_t$ and variance comprises $\sigma^2$. In various embodiments, the aforementioned equations allow a dynamic pricing system to obtain a posterior on $\gamma_\star$ (e.g., an elasticity or an elasticity parameter) using a Bayes update algorithm. In the same or different embodiments, a dynamic pricing system can determine how $Rev_t$ depends on $\gamma_\star$ by letting:

$$\theta_{ti} = \frac{p_i^2 f_{i,t}}{p_{i,t-1}} - p_i f_{i,t};$$

$$\overline{R}_t = p_i f_{i,t}, \text{ and therefore } Rev_t = \gamma_\star^T \theta_t + \overline{R}_t;$$

$$N(R_t; Rev_t, \sigma^2) = N(R_t; \gamma_\star^T \theta_t + \overline{R}_t, \sigma^2);$$

$$\propto \exp\left(-\frac{1}{\sigma^2}(R_t - \overline{R}_t - \gamma_\star^T \theta_t)^2\right);$$

$$\propto \exp(-(\gamma_\star - \beta_t)^T M_t^{-1}(\gamma_\star - \beta_t)), \text{ where }$$

$$M_t^{-1}\beta_t = \frac{R_t - \overline{R}_t}{\sigma^2}\theta_t;$$

$$M_t^{-1} = \frac{1}{\sigma^2}\theta_t \theta_t^T + \lambda I;$$

$$\Pi_t(\gamma_\star) \propto N\left(\gamma_\star; \mu_{t-1}, \sum_{t-1}\right) N(\gamma; \beta_t, M_t);$$

$$\propto N\left(\gamma_\star; \mu_t, \sum_t\right),$$

where $\mu_t, \Sigma_t$ are given by regular expressions comprising:

$$\mu_t = \left(\sum_{t-1}^{-1} + M_t^{-1}\right)^{-1}\left(\sum_{t-1}^{-1} \mu_{t-1} + \frac{R_t - \overline{R}_t}{\sigma^2}\theta_t\right);$$

$$\sum_t = \left(\sum_{t-1}^{-1} + M_t^{-1}\right)^{-1},$$

where $M_t$ can be calculated using equations comprising:

$$M_t^{-1} = \frac{\theta_t \theta_t^T}{\sigma^2} + \lambda I;$$

$$M_t^{-1}\beta_t = \frac{(R_t \overline{R}_t)\theta_t}{\sigma^2}.$$

In some embodiments, $p_i$ comprises a price of one or more items i, $f_{i,t}$ comprises a demand forecast for one or more items i on a day t, $\gamma_{\star,i}$ comprises a price elasticity of item i, $\Pi_t(\gamma_\star)$ comprises a prior distribution over $\gamma_\star$, $\mu_0$ comprises, $N(R_t; Rev_t, \sigma^2)$ comprises a normal distribution describing an observed revenue $R_t$, $\Sigma_0$ comprises a covariance matrix of a prior distribution of $\gamma_\star$, $l(R_t; Rev_t, \gamma_\star)$ comprises a likelihood of observing a revenue $R_t$ when an average revenue comprises $Rev_t$ and a variance comprises $\sigma^2$, $\theta_{ti}$ comprises a vector, $\overline{R}_t$ comprises a forecasted revenue, $\gamma_\star^T$ comprises an unknown elasticity vactor, $M_t^{-1}$ comprises a matrix inverse, $\beta_t$ comprises an auxiliary vector, and I comprises an identity matrix.

In many embodiments, $\lambda > 0$ can comprise a small positive constant added to a matrix $M_t$ to make $M_t$ invertible. In various embodiments, a prior distribution over an elasticity parameter for one or more items in an electronic basket of items comprises a Gaussian prior distribution. In some embodiments, an equation comprising $\Pi_0(\gamma_\star) = N(\mu_0, \Sigma_0)$ places a Gaussian prior on an elasticity vector $\gamma_\star$. In many embodiments, a likelihood model over past revenue for the one or more items in an electronic basket of items comprises a Gaussian likelihood model. In the same or different embodiments, an equation comprising $l(R_t; Rev_t, \gamma_\star) = N(R_t; Rev_t, \sigma^2)$ places a Gaussian likelihood on an observed revenue.

One might argue that, because an elasticity parameter is negative and revenue is always positive, a Gaussian prior and Gaussian likelihood are incorrect models because a Gaussian distribution does not rule out positive elasticities. Positive elasticities could then predict that demand would increase as price increases, which is an unlikely scenario for types of consumer goods sold by many e-commerce retailers. However, in some embodiments, using this combination of prior and likelihood leads to very simple posterior updates and improved results, as described below.

Continuing with method 400 in FIG. 4, in many embodiments, method 400 can comprise an activity 408 of estimating an elasticity for one or more items in the electronic basket of items using the prior distribution over the elasticity parameter and the likelihood model over the past revenue. In some embodiments of method 400, activities 406, 407, and 408 are part of activity 405. In the same or different embodiments, one or more of activities 406, 407, and 408 can be optional.

In many embodiments, an elasticity parameter can be rejected when the elasticity parameter is greater than a predetermined threshold. In some embodiments incorporating a TS model, rejection sampling on an elasticity parameter can be performed. For example, elasticity samples that are positive can be rejected, which alleviates a prior distribution from having non-zero mass on elasticity values that are positive. In some embodiments, other distributions can be put on elasticity and/or revenue that reflect that these parameters take only a restricted set of values (e.g., a log-normal distribution). However, with such other distributions, it can be hard to obtain closed form updates, and approximate sampling techniques may need to be used.

In many embodiments, update equations can be used on a prior distribution and an estimate for the noise variance $\sigma^2$. In some embodiments, a dynamic pricing system can have access to prior estimates for elasticities that used historical data. In various embodiments, these prior estimates can be used as a mean $\mu_0$ of a prior distribution. In the same or different embodiments, a dynamic pricing system can set $\Sigma_0 = cI$, for some appropriate constant c. For example, a constant c can be made large enough to perform exploration, but not so large as to wash out values in $\mu_0$. In many embodiments, an estimate of a can be obtained using historical data to calculate a sample standard deviation of an observed revenue of a basket of items. In some embodiments, by keeping only a diagonal approximation of the covariance matrix and by using Sherman-Morrison-Woodbury identity, a dynamic pricing system can operate using $O(|\mathcal{B}|)$ runtime and storage complexity, thereby allowing for greater processing speeds and faster processing times.

In many embodiments, method 400 can comprise an activity 409 of determining a price using the demand and the elasticity. In many embodiments, a dynamic pricing system can comprise an optimization system aids in outputting prices of one or more items. In various embodiments, an optimization system can put multiple items into a basket, and impose various constraints on prices of the one or more items in the basket. In the same or different embodiments, constraints can be set by business needs, and can include as minimum and/or maximum prices for one or more items in a basket of items, bounds on how much the price of an item in the basket can change each day (e.g., 5%, 10%, $1.00, $2.00, etc.), and/or basket-wide level constraints (e.g., minimum margin on a basket). In some embodiments, when one or more items in a basket of items are sold by other retailers, prices of the other e-commerce retailers can be used as constraints. For example, a constraint can comprise keeping an item within a certain percentage or dollar amount of a price of another retailer. In various embodiments, constraints can change as needs of the business change. In many embodiments, an optimization system can assume that a constraint set is a feasible, convex set that can therefore be simple enough to enable optimization.

In many embodiments, activity 409 can further comprise optimizing a concave function using convex constraints. In the same or different embodiments, revenue of one or more items i in a basket $\mathcal{B}$ can be estimated as $\text{Rev}_{i,t}(p_{i,t}) = p_{i,t} d_{i,t}(p_{i,t})$, where $p_{i,t}$ comprises a price of one or more items i at on a day t, $d_i(p_{i,t})$ comprises a demand of one or more items i at price $p_i$ on a day t. In the same or different embodiments, this equation can be estimated as $$p_{i,t}\left(f_{i,t} + (p_{i,t} - p_{i,t-1})\frac{f_{i,t}\gamma_{\star,i}}{p_{i,t-1}}\right),$$

where $p_{i,t}$ comprises a price of one or more items i at on a day t, $f_{i,t}$ comprises a demand forecast for one or more items i on a day t, and $\gamma_{\star,i}$ comprises a price elasticity of item i. In various embodiments, this estimation can be re-written as $$\frac{p_{i,t}^2 f_{i,t}\gamma_{\star,i}}{p_{i,t-1}} - p_{i,t}f_{i,t}\gamma_{\star,i} + p_{i,t}f_{i,t},$$

where $p_{i,t}$ comprises a price of one or more items i at on a day t, $f_{i,t}$ comprises a demand forecast for one or more items i on a day t, and $\gamma_{\star,i}$ comprises a price elasticity of item i. In the same or different embodiments, $p = [p_1, p_2, \ldots p_{|\mathcal{B}|}]$ can be a vector comprising prices of one or more items in a basket $\mathcal{B}$. In these embodiments, an optimization system can solve an problem using estimates for the quantities $\gamma_{\star,i}$ and $f_{i,t}$ obtained as described above using an equation comprising $$p_t = \arg\max_p \sum_{i \in \mathcal{B}} \frac{p_{i,t}^2 f_{i,t}\gamma_{\star,i}}{p_{i,t-1}} - p_{i,t}f_{i,t}\gamma_{\star,i} + p_{i,t}f_{i,t}$$

subject to $p = [p_1, p_2, \ldots, p_{|\mathcal{B}|}] \in \mathcal{C}_t$, where $p_{i,t}$ comprises a price of one or more items i on a day t, $f_{i,t}$ comprises a demand forecast for one or more items i on a day t, $\gamma_{\star,i}$ comprises a price elasticity of item i, $\mathcal{B}$ comprises a basket of items, and $\mathcal{C}_t$ comprises a possible price for an item in the basket of items. In various embodiments, price elasticities are negative, and this optimization problem can maximize a concave function subject to convex constraints. Therefore, this situation can be a convex optimization problem that can be solved using standard techniques.

In many embodiments, method 400 can comprise an activity 410 of facilitating display of the price on an e-commerce website and/or on a video screen of a device. In the same or different embodiments, a price can be displayed in an application on a video screen of a mobile device.

Figure 5:
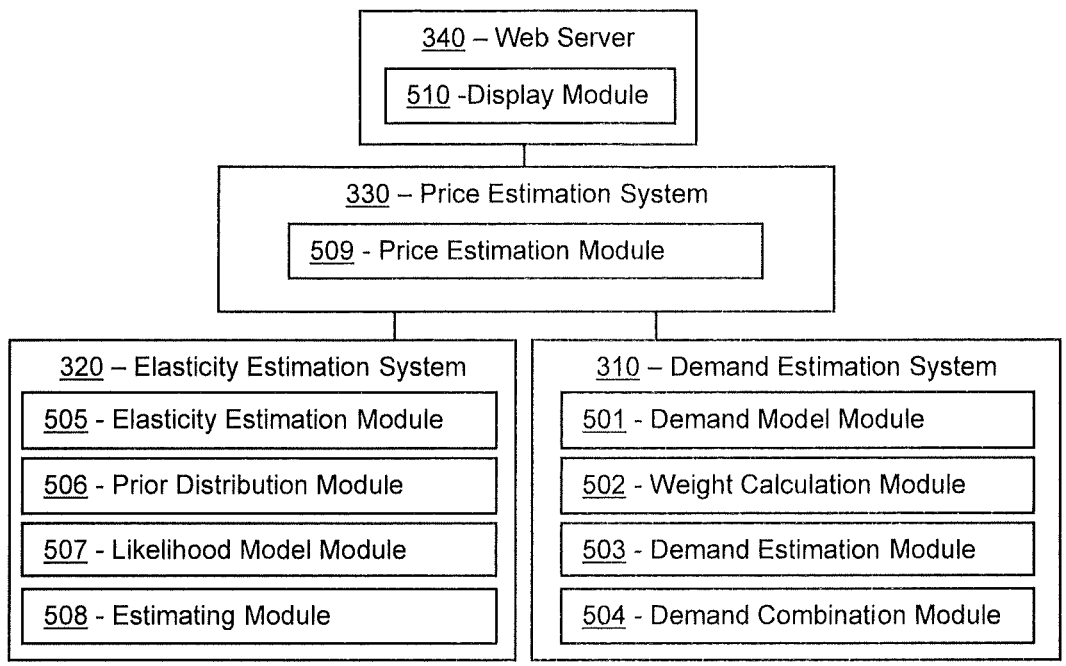
FIG. 5 illustrates a representative block diagram of the system of FIG. 3, according to an embodiment.

FIG. 5 illustrates a block diagram of a portion of system 300 comprising demand estimation system 310, elasticity estimation system 320, price estimation system 330, and web server 340, according to the embodiment shown in FIG. 3. Each of demand estimation system 310, elasticity estimation system 320, price estimation system 330, and/or web server 340 is merely exemplary and not limited to the embodiments presented herein. Each of demand estimation system 310, elasticity estimation system 320, price estimation system 330, and/or web server 340 can be employed in many different embodiments or examples not specifically depicted or described herein. In some embodiments, certain elements or modules of demand estimation system 310, elasticity estimation system 320, price estimation system 330, and/or web server 340 can perform various procedures, processes, and/or acts. In other embodiments, the procedures, processes, and/or acts can be performed by other suitable elements or modules.

In many embodiments, demand estimation system 310 can comprise non-transitory memory storage module 501. Memory storage module 501 can be referred to as demand model module 501. In many embodiments, demand model module 501 can store computing instructions configured to run on one or more processing modules and perform one or more acts of method 400 (FIG. 4) (e.g., activity 401 (FIG. 4)).

In many embodiments, demand estimation system 310 can comprise non-transitory memory storage module 502. Memory storage module 502 can be referred to as weight calculation module 502. In many embodiments, weight calculation module 502 can store computing instructions configured to run on one or more processing modules and perform one or more acts of method 400 (FIG. 4) (e.g., activity 402 (FIG. 4)).

In many embodiments, demand estimation system 310 can comprise non-transitory memory storage module 503. Memory storage module 503 can be referred to as demand estimation module 503. In many embodiments, demand estimation module 503 can store computing instructions configured to run on one or more processing modules and perform one or more acts of method 400 (FIG. 4) (e.g., activity 403 (FIG. 4)).

In many embodiments, demand estimation system 310 can comprise non-transitory memory storage module 504. Memory storage module 504 can be referred to as demand combination module 504. In many embodiments, demand combination module 504 can store computing instructions configured to run on one or more processing modules and perform one or more acts of method 400 (FIG. 4) (e.g., activity 404 (FIG. 4)). In some embodiments, weight calculation module 502, demand estimation module 503, and demand combination module 504 can be submodules of demand model module 501.

In many embodiments, elasticity estimation system 320 can comprise non-transitory memory storage module 505.

Memory storage module 505 can be referred to as elasticity estimation module 505. In many embodiments, elasticity estimation module 505 can store computing instructions configured to run on one or more processing modules and perform one or more acts of method 400 (FIG. 4) (e.g., activity 405 (FIG. 4)).

In many embodiments, elasticity estimation system 320 can comprise non-transitory memory storage module 506. Memory storage module 506 can be referred to as prior distribution module 506. In many embodiments, prior distribution module 506 can store computing instructions configured to run on one or more processing modules and perform one or more acts of method 400 (FIG. 4) (e.g., activity 406 (FIG. 4)).

In many embodiments, elasticity estimation system 320 can comprise non-transitory memory storage module 507. Memory storage module 507 can be referred to as likelihood model module 507. In many embodiments, likelihood model module 507 can store computing instructions configured to run on one or more processing modules and perform one or more acts of method 400 (FIG. 4) (e.g., activity 407 (FIG. 4)).

In many embodiments, elasticity estimation system 320 can comprise non-transitory memory storage module 508. Memory storage module 508 can be referred to as estimating module 508. In many embodiments, estimating module 508 can store computing instructions configured to run on one or more processing modules and perform one or more acts of method 400 (FIG. 4) (e.g., activity 408 (FIG. 4)). In some embodiments, prior distribution module 506, likelihood module 507, and estimating module 508 can be submodules of elasticity estimation module 505.

In many embodiments, price estimation system 330 can comprise non-transitory memory storage module 509. Memory storage module 509 can be referred to as price estimation module 509. In many embodiments, price estimation module 509 can store computing instructions configured to run on one or more processing modules and perform one or more acts of method 400 (FIG. 4) (e.g., activity 409 (FIG. 4)).

In many embodiments, web server 340 can comprise non-transitory memory storage module 510. Memory storage module 510 can be referred to as display module 510. In many embodiments, display module 510 can store computing instructions configured to run on one or more processing modules and perform one or more acts of method 400 (FIG. 4) (e.g., activity 410 (FIG. 4)).

Example 1

In a first example, synthetic datasets were generated for testing a performance of the aforementioned embodiments of a dynamic pricing system. A basket of 100 items was created, each with elasticity in an interval of [−3, −1]. At time t for each item, a demand forecast was generated for the item $f_{i,t}$ using an auto regressive process on the demands previously observed, and the exponential formula $$d_{i,t}(p_{i,t}) = \max\left(f_{i,t}\left(\frac{p_{i,t}}{p_{i,t-1}}\right)^{\gamma_{*,i}} + \epsilon_t, 0\right)$$

was used to generate the demand at the price $p_{i,t}$. All prices were constrained to belong to the set $C_t=[10,20]$. This process was repeated for T=100 rounds for both a passive learning algorithm and an active learning (MAB) algorithm.

Figure 6:
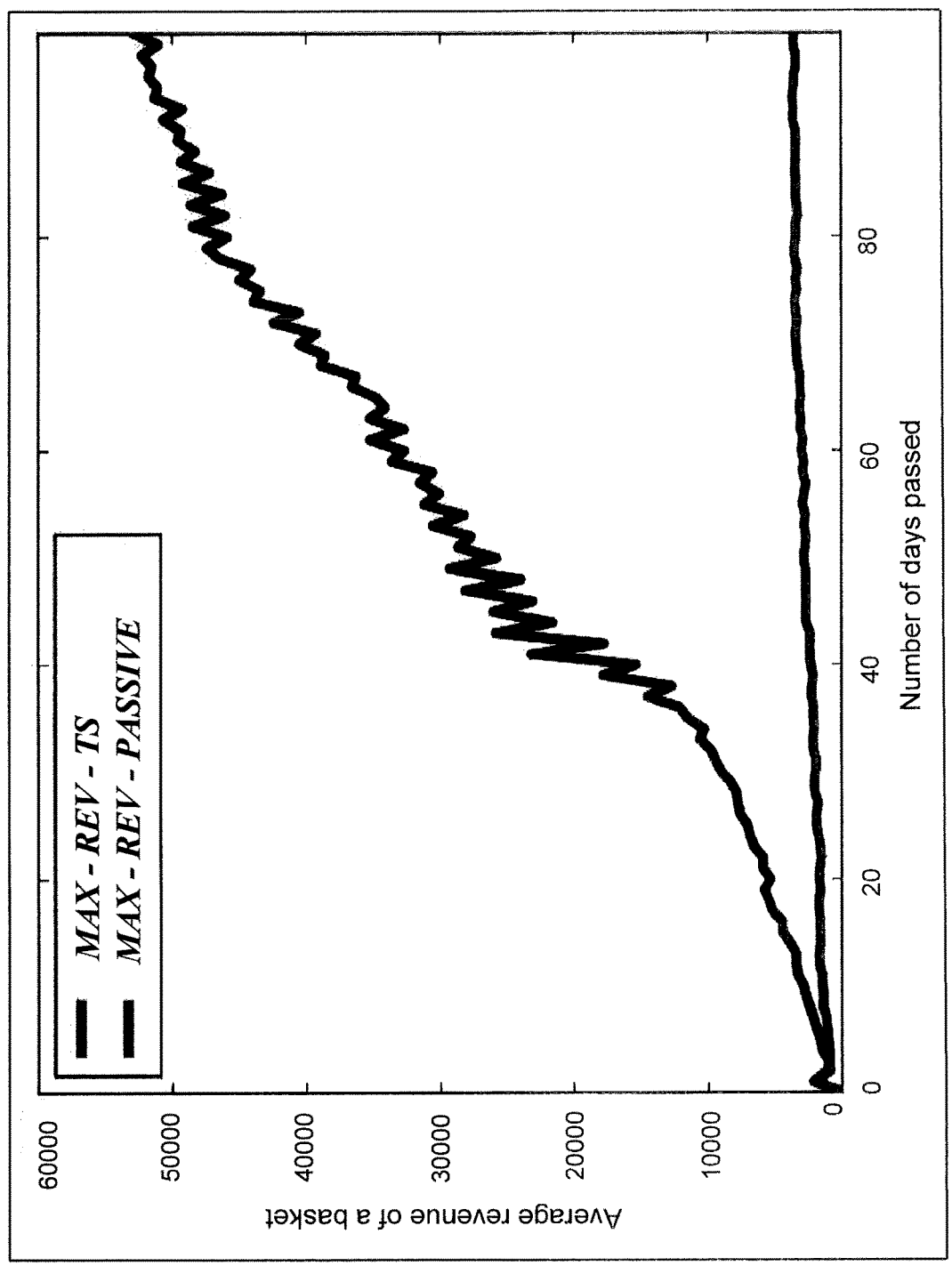
FIG. 6 illustrates a graphical representation of an Example 1.

A total revenue of all items in the basket was calculated on each day. 10 independent trials for each algorithm were run and the average of the total revenue for both the algorithms was reported in FIG. 6. As one can see from this figure, MAX-REV-TS (otherwise known as an active learning algorithm and shown as the upper line in the graph), continues to learn and obtains increasing revenue as time progresses. In contrast, MAX-REV-PASSIVE (otherwise known as a passive learning algorithm and shown as the lower line in the graph), learns very slowly and the average revenue stays almost the same with time.

Example 2

Figure 7:
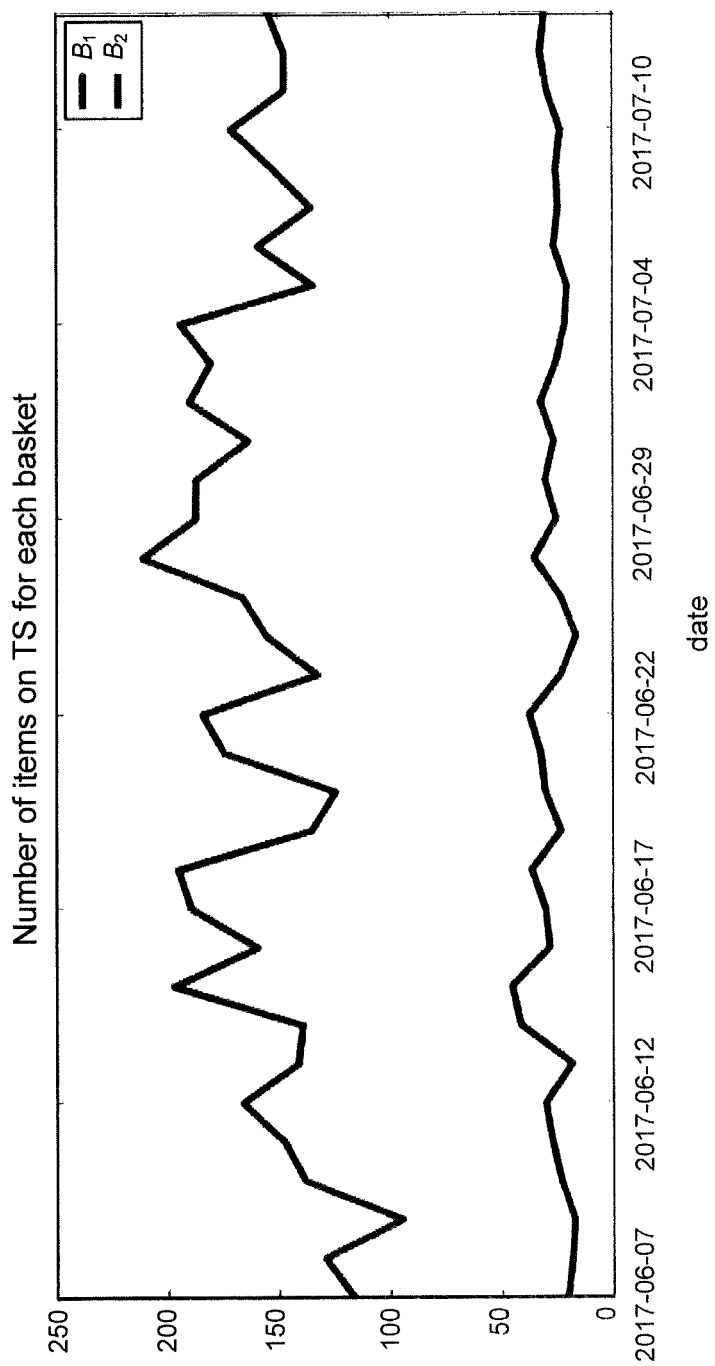
FIG. 7 illustrates another graphical representation of Example 1.
Figure 8:
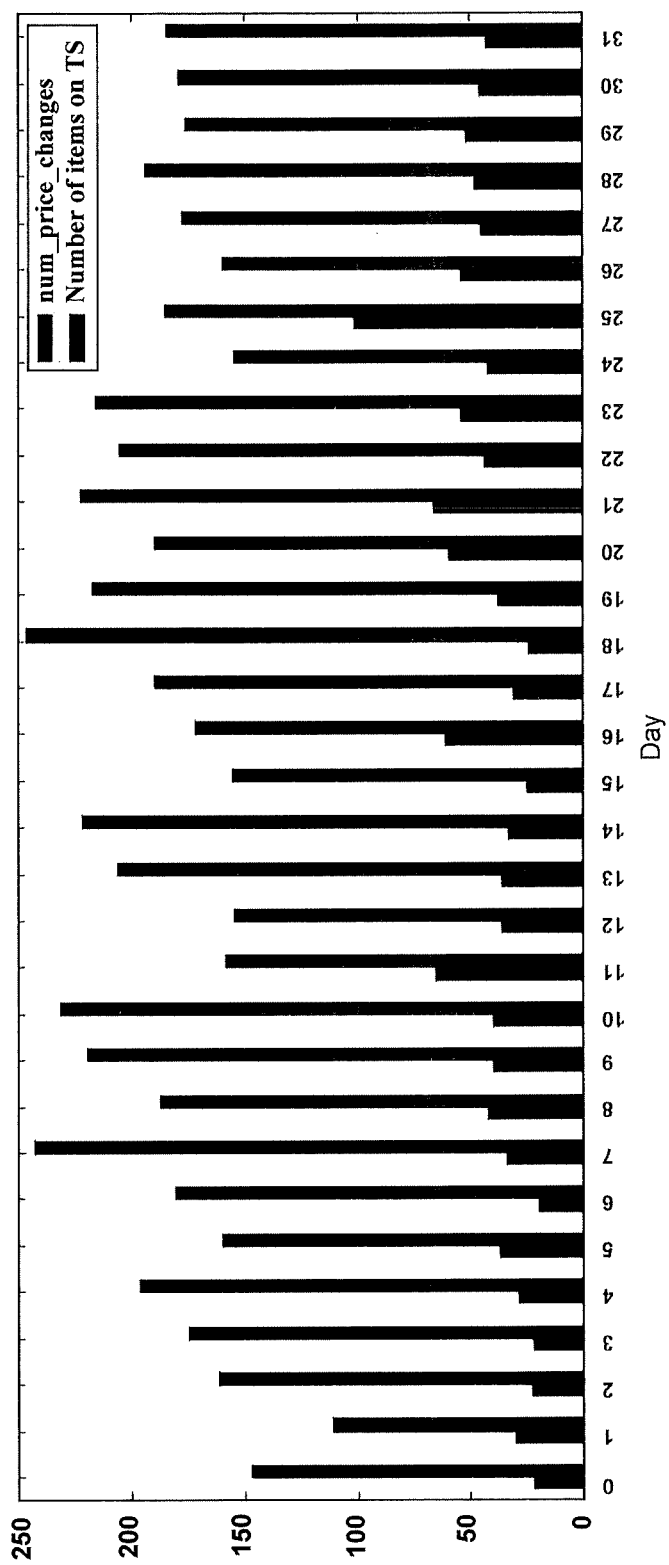
FIG. 8 illustrates another graphical representation of Example 1.

In a second example, the aforementioned dynamic pricing system was tested on a real world dataset. An experiment was performed on two separate, unrelated baskets. The first basket $\mathcal{B}_1$ had roughly 19000 items and the second basket, $\mathcal{B}_2$ had roughly 5000 items. Each of these baskets had well defined parameters such as margin goals that may need to be achieved on the basket, upper and lower bounds on the price of the items. Each basket $\mathcal{B}$ was partitioned into two disjointed sets, namely $\mathcal{B}_f$ and $\mathcal{B}_{MAX-REV}$. The part $\mathcal{B}_f$ included items for which prices were already pre-fixed by various business constraints and hence were not part of the MAX-REV optimization problem. $\mathcal{B}_{MAX-REV}$, was the subset of the basket on which MAX-REV was run that generates a new set of prices. This subset consists of items that were published in-stock, with no active promotions. The set of items in $\mathcal{B}_{MAX-REV}$, can be further broken down into two disjoint parts, namely $\mathcal{B}_P$ and $\mathcal{B}_{TS}$. $\mathcal{B}_P \subset \mathcal{B}_{MAX-REV}$ is the set of items which were not eligible for a TS algorithm, because of low demand forecast (a demand forecast threshold of 2 was used). For items in $\mathcal{B}_P$ passive elasticity estimation methods were used such as OLS and/or RLS to calculate their elasticities. The MAX-REV-TS algorithm was applied on the set $\mathcal{B}_{TS}$. MAX-REV-TS was run for about five weeks. On every third day, TS updates were performed to get an updated posterior distribution over their elasticities. The number of items that are on TS, on a particular day, in baskets $\mathcal{B}_1$ and $\mathcal{B}_2$ individually is shown in FIG. 7 (where basket $\mathcal{B}_2$ is the upper line and basket $\mathcal{B}_1$ is the lower line) and combined is shown by the right-side bars in FIG. 8 (where the number of price changes are the left (and generally lower) bars and the number of items on TS are the right (and generally higher) bars). By design, TS encourages exploration of elasticity values for different items. This exploration in elasticity space also forces exploration of the price-demand curve of an item. Hence, a good number of price changes among items that are put on TS are expected. The left-side bars in FIG. 8 indicate that among the items that were put on TS, for how many items a price change was observed, compared to their prices on the previous day. As shown by FIG. 8, roughly 20%-30% of the items had price changes.

Figure 9:
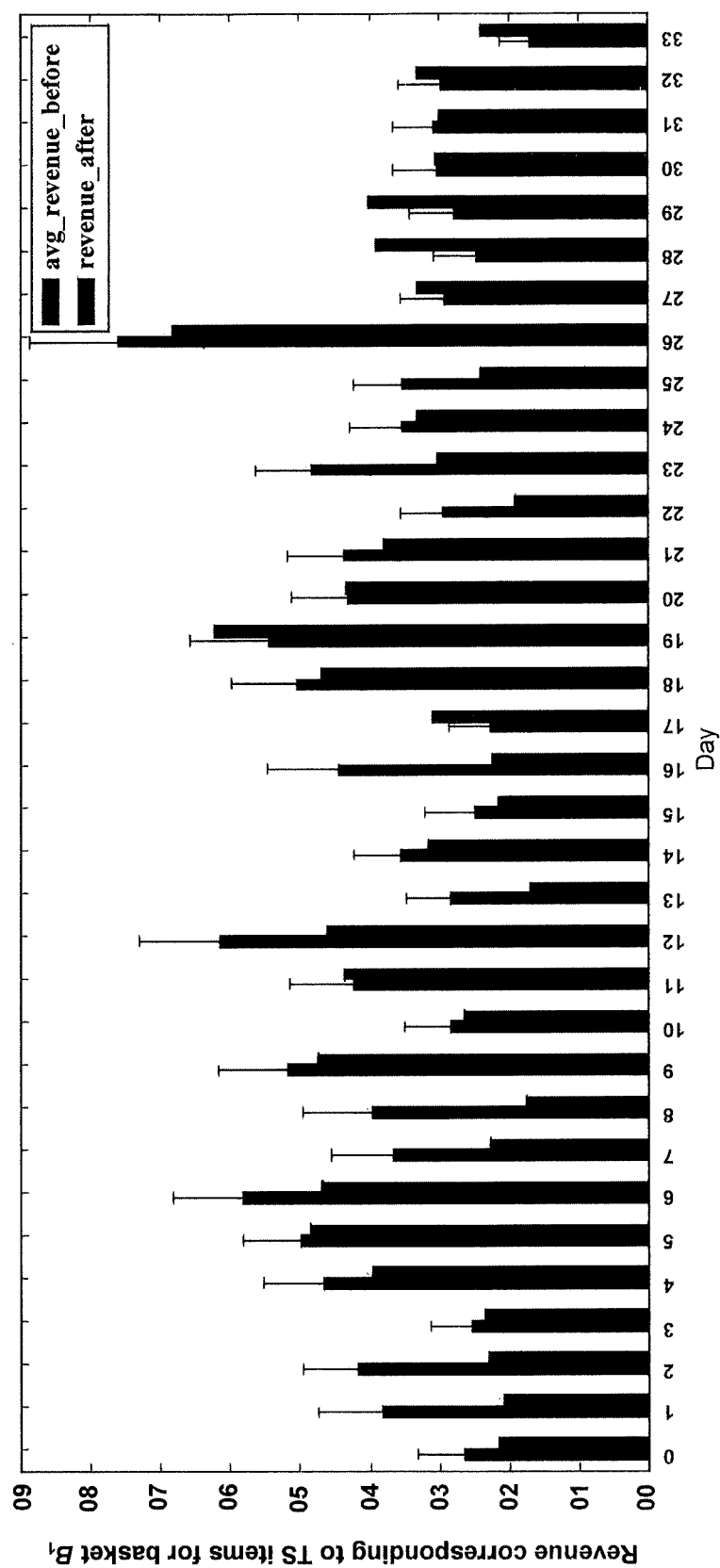
FIG. 9 illustrates a graphical representation of an Example 2.
Figure 10:
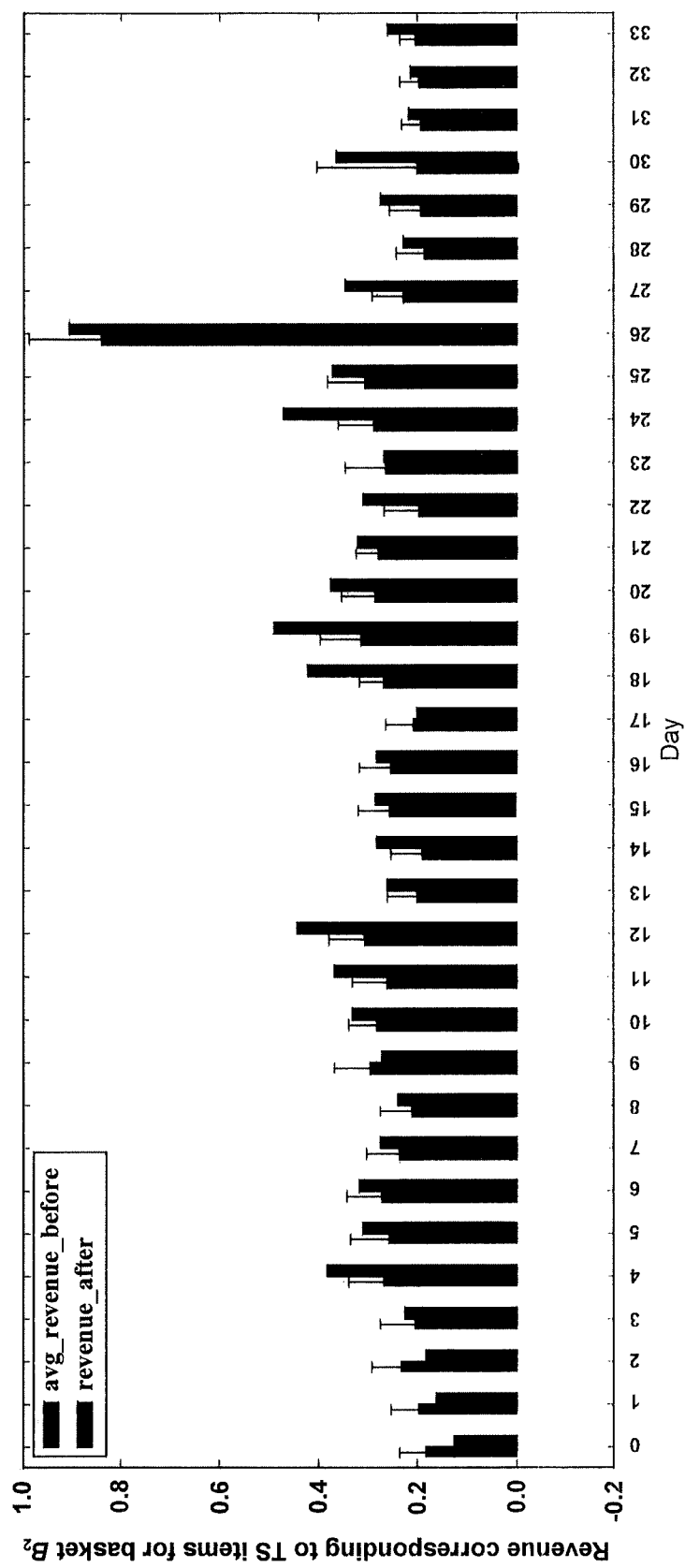
FIG. 10 illustrates another graphical representation of Example 2.

FIGS. 9 and 10 show the revenue obtained by items that were put on TS each day for baskets $\mathcal{B}_1$ and $\mathcal{B}_2$ (where the average revenue before are the left bars and the revenue after are the right bars). For items put on TS, each day, an average revenue (and the standard deviation) corresponding to these items was calculated before the start of the TS experiment. This average was calculated over a span of 30 days before the start of a TS period. Because, MAX-REV-PASSIVE was applied before the start of TS period, the results provide a comparison of MAX-REV-TS with MAX-REV-PASSIVE. On basket $\mathcal{B}_1$, from a revenue point of view, TS initially does not seem to help as it gets lower revenue as compared to no TS. This situation is because the variances in the estimates of elasticity were initially large. However, about half-way through the experimental period, revenue contribution due to items on TS improves, and are competent with the average revenue before the start of the TS period. On basket $\mathcal{B}_2$, the results suggest that TS consistently outperforms the revenue obtained before the start of TS period.

Although systems and methods for dynamically determining price have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and cause the one or more processors to perform functions comprising:
   estimating, at a demand estimation system, a demand for one or more items in an electronic basket of items using one or more different demand models;
   training, at an elasticity estimation system and a price estimation system separate from the elasticity estimation system, a multi-armed bandit model by executing a first explore stage of a Thompson sampling algorithm operating on the elasticity estimation system, the first explore stage configured to make sub-optimal decisions and gather data by pulling one or more random arms of the multi-armed bandit model;
   estimating, at the elasticity estimation system and the price estimation system separate from the elasticity estimation system, an elasticity for the one or more items in the electronic basket of items by executing a second exploit stage of the Thompson sampling algorithm operating on the elasticity estimation system, the
   second exploit stage configured to determine a price using the demand and the elasticity by pulling an arm of the one or more random arms with a lowest regret, as determined during the first explore stage;
   transmitting the price to a web server; and
   facilitating displaying the price on a video screen of a device when the device queries the web server,
   wherein estimating the elasticity for the one or more items in the electronic basket of items comprises:
   placing a prior distribution over an elasticity parameter for the one or more items in the electronic basket of items;
   placing a likelihood model over past revenue for the one or more items in the electronic basket of items; and
   estimating the elasticity for the one or more items in the electronic basket of items using the prior distribution over the elasticity parameter and the likelihood model over the past revenue.

2. The system of claim 1, wherein:
   the one or more different demand models comprise multiple demand models;
   estimating the demand for the one or more items in the electronic basket of items comprises:
   calculating a respective weight for each demand model of the multiple demand models based on a respective accuracy of each demand model of the multiple demand models;
   estimating a respective demand for each of the one or more items in the electronic basket of items using each demand model of the multiple demand models; and
   combining the respective demand, as estimated by each demand model of the multiple demand models, into a combined estimated demand using the respective weight for each demand model of the multiple demand models.

3. The system of claim 1, wherein the multi-armed bandit model further comprises an upper confidence bound algorithm.

4. The system of claim 1, wherein:
   the prior distribution over the elasticity parameter for the one or more items in the electronic basket of items comprises a Gaussian prior distribution; and
   the likelihood model over the past revenue for the one or more items in the electronic basket of items comprises a Gaussian likelihood model.

5. The system of claim 4, wherein the Gaussian prior distribution comprises:
   $\Pi_0(\gamma_\star) = N(\mu_0, \Sigma_0)$, wherein:
   $\gamma_\star$ comprises the elasticity parameter;
   $\mu_0$ comprises a mean of the prior distribution; and
   $\Sigma_0$ comprises a covariance matrix of the prior distribution.

6. The system of claim 4, wherein the Gaussian likelihood model comprises:
   $l(R_t; \text{Rev}_t, \gamma_\star) = N(R_t; \text{Rev}_t, \sigma^2)$, wherein:
   $R_t$ comprises a revenue for the electronic basket of items on a day t;
   $\text{Rev}_t$ comprises an average revenue of each item in the electronic basket of items;
   $\gamma_\star$ comprises the elasticity parameter; and
   $\sigma$ comprises a noise variance.

7. The system of claim 1, wherein:
   estimating the elasticity for the one or more items in the electronic basket of items further comprises:

rejecting the elasticity parameter when the elasticity parameter is greater than a predetermined threshold; and determining the price comprises:
optimizing a concave function using convex constraints.

8. The system of claim 7, wherein the concave function comprises:

$$p_t = \arg\max_p \sum_{i \in \mathcal{B}} \frac{p_i^2 f_{i,t} \, \gamma_{\star,i}}{p_{i,t-1}} - p_i f_{i,t} \, \gamma_{\star,i} + p_i f_{i,t},$$

wherein:
p comprises the price;
i comprises the one or more items;
$\mathcal{B}$ comprises the electronic basket of items;
$f_{i,t}$ comprises a demand forecast for the one or more items on a day t; and
$\gamma_{\star}$ comprises the elasticity parameter.

9. The system of claim 1, wherein the one or more different demand models comprise:

$$d_{i,t}(p_i) = f_{i,t}\left(\frac{p_i}{p_{i,t-1}}\right)^{\gamma_{\star,i}},$$

wherein:
$d_{i,t}$ comprises a demand for the one or more items i on a day t;
$p_i$ comprises a price of the one or more items;
$f_{i,t}$ comprises a demand forecast for the one or more items on a day t; and
$\gamma_{\star}$ comprises the elasticity parameter.

10. A method being implemented via execution of computing instructions configured to run at one or more processors and configured to be stored at non-transitory computer-readable media, the method comprising:
estimating, at a demand estimation system, a demand for one or more items in an electronic basket of items using one or more different demand models;
training, at an elasticity estimation system and a price estimation system separate from the elasticity estimation system, a multi-armed bandit model by executing a first explore stage of a Thompson sampling algorithm operating on the elasticity estimation system, the first explore stage configured to make sub-optimal decisions and gather data by pulling one or more random arms of the multi-armed bandit model;
estimating, at the elasticity estimation system and the price estimation system separate from the elasticity estimation system, an elasticity for the one or more items in the electronic basket of items by executing a second exploit stage of the Thompson sampling algorithm operating on the elasticity estimation system, the second exploit stage configured to determine a price using the demand and the elasticity by pulling an arm of the one or more random arms with a lowest regret, as determined during the first explore stage
transmitting the price to a web server; and
facilitating displaying the price on a video screen of a device when the device queries the web server,
wherein estimating the elasticity for the one or more items in the electronic basket of items comprises:

placing a prior distribution over an elasticity parameter for the one or more items in the electronic basket of items;
placing a likelihood model over past revenue for the one or more items in the electronic basket of items; and
estimating the elasticity for the one or more items in the electronic basket of items using the prior distribution over the elasticity parameter and the likelihood model over the past revenue.

11. The method of claim 10, wherein:
the one or more different demand models comprise multiple demand models;
estimating the demand for the one or more items in the electronic basket of items comprises:
calculating a respective weight for each demand model of the multiple demand models based on a respective accuracy of each demand model of the multiple demand models;
estimating a respective demand for each of the one or more items in the electronic basket of items using each demand model of the multiple demand models; and
combining the respective demand, as estimated by each demand model of the multiple demand models, into a combined estimated demand using the respective weight for each demand model of the multiple demand models.

12. The method of claim 10, wherein the multi-armed bandit model further comprises an upper confidence bound algorithm.

13. The method of claim 10, wherein:
the prior distribution over the elasticity parameter for the one or more items in the electronic basket of items comprises a Gaussian prior distribution; and
the likelihood model over the past revenue for the one or more items in the electronic basket of items comprises a Gaussian likelihood model.

14. The method of claim 13, wherein the Gaussian prior distribution comprises:
$\Pi_0(\gamma_{\star}) = N(\mu_0, \Sigma_0)$, wherein:
$\gamma_{\star}$ comprises the elasticity parameter;
$\mu_0$ comprises a mean of the prior distribution; and
$\Sigma_0$ comprises a covariance matrix of the prior distribution.

15. The method of claim 13, wherein the Gaussian likelihood model comprises:
$l(R_t; \text{Rev}_t, \gamma_{\star}) = N(R_t; \text{Rev}_t, \sigma^2)$, wherein:
$R_t$ comprises a revenue for the electronic basket of items on a day t;
$\text{Rev}_t$ comprises an average revenue of each item in the electronic basket of items;
$\gamma_{\star}$ comprises the elasticity parameter; and
$\sigma$ comprises a noise variance.

16. The method of claim 10, wherein:
estimating the elasticity for the one or more items in the electronic basket of items further comprises:
rejecting the elasticity parameter when the elasticity parameter is greater than a predetermined threshold; and determining the price comprises:
optimizing a concave function using convex constraints.

17. The method of claim 16, wherein the concave function comprises:

$$p_t = \arg\max_p \sum_{i \in \mathcal{B}} \frac{p_{i,t}^2 f_{i,t} \, \gamma_{\star,i}}{p_{i,t-1}} - p_i f_{i,t} \, \gamma_{\star,i} + p_i f_{i,t},$$

wherein:
  p comprises the price;
  i comprises the one or more items;
  $\mathcal{B}$ comprises the electronic basket of items;
  $f_{i,t}$ comprises a demand forecast for the one or more items on a day t; and
  $\gamma_\star$ comprises the elasticity parameter.

18. The method of claim 10, wherein the one or more different demand models comprise:

$$d_{i,t}(p_i) = f_{i,t}\left(\frac{p_i}{p_{i,t-1}}\right)^{\gamma_{\star,i}},$$

wherein:
  $d_{i,t}$ comprises a demand for the one or more items i on a day t;
  $p_i$ comprises a price of the one or more items;
  $f_{i,t}$ comprises a demand forecast for the one or more items on a day t; and
  $\gamma_\star$ comprises the elasticity parameter.

19. The system of claim 1, wherein the multi-armed bandit model further comprises an $\in$ greedy algorithm.

20. The method of claim 10, wherein the multi-armed bandit model further comprises an $\in$ greedy algorithm.

* * * * *